(12) United States Patent
Kneissler et al.

(10) Patent No.: US 8,610,664 B2
(45) Date of Patent: Dec. 17, 2013

(54) METHOD OF CONTROLLING A CONTROL POINT POSITION ON A COMMAND AREA AND METHOD FOR CONTROL OF A DEVICE

(75) Inventors: Jan Kneissler, Aachen (DE); Eric Thelen, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 738 days.

(21) Appl. No.: 11/995,010

(22) PCT Filed: Jul. 3, 2006

(86) PCT No.: PCT/IB2006/052232
§ 371 (c)(1),
(2), (4) Date: Jan. 8, 2008

(87) PCT Pub. No.: WO2007/007227
PCT Pub. Date: Jan. 18, 2007

(65) Prior Publication Data
US 2008/0204404 A1 Aug. 28, 2008

(30) Foreign Application Priority Data

Jul. 11, 2005 (EP) .................................... 05106316

(51) Int. Cl.
*G06F 3/033* (2013.01)
(52) U.S. Cl.
USPC ............................. 345/157; 345/156; 345/158
(58) Field of Classification Search
USPC ................................................ 345/156–183
See application file for complete search history.

(56) References Cited

U.S. PATENT DOCUMENTS

| 5,627,565 | A | * | 5/1997 | Morishita et al. | ............. 345/158 |
| 6,512,507 | B1 | * | 1/2003 | Furihata et al. | ............. 345/157 |
| 6,764,185 | B1 | | 7/2004 | Beardsley | |

(Continued)

FOREIGN PATENT DOCUMENTS

| CN | 101223493 A | 7/2008 |
| FR | 2814026 A1 | 3/2003 |
| GB | 2387755 A1 | 10/2003 |
| JP | 2003208260 A | 7/2003 |

(Continued)

OTHER PUBLICATIONS

Qing Xia et al., "Screen Estimation of a Novel Pointing Device based on Corner Detection and Classification", Master Thesis, Delft University of Technology, Philips Research Lab, Aachen, Germany, sec. 3, Models and Algorithms Overview.

(Continued)

*Primary Examiner* — Christopher E Leiby

(57) ABSTRACT

The invention describes a method of controlling a position (x', y') of a control point (c) on a command area ($A_{CM}$). This method comprises the steps of: —aiming a pointing device (1) comprising a camera (2) in the direction of the command area ($A_{CM}$); —generating an image (I) of a target area ($A_I$) aimed at by the pointing device; —processing the target area image (I) to determine a target point (T) at which the pointing device (1) is aimed; —determining position (x', y') of the control point (C) according to the position (x, y) of the target point (T) within a currently defined control area ($A_{CT}$), which control area ($A_{cr}$) includes at least partially the command area ($A_{CM}$). Moreover the invention describes an adequate system and a pointing device (1) for controlling a control point position (P) on a command area ($A_{CM}$).

17 Claims, 4 Drawing Sheets

(56) References Cited

U.S. PATENT DOCUMENTS

| | | | |
|---|---|---|---|
| 7,030,856 B2 * | 4/2006 | Dawson et al. | 345/158 |
| 2003/0210229 A1 * | 11/2003 | Nishimura et al. | 345/157 |
| 2003/0234772 A1 * | 12/2003 | Zhang et al. | 345/177 |
| 2004/0095317 A1 * | 5/2004 | Zhang et al. | 345/158 |
| 2004/0252102 A1 | 12/2004 | Wilson | |
| 2005/0103978 A1 | 5/2005 | Yang et al. | |
| 2005/0104849 A1 * | 5/2005 | Hoile | 345/157 |
| 2005/0116931 A1 * | 6/2005 | Olbrich | 345/158 |
| 2005/0180631 A1 * | 8/2005 | Zhang et al. | 382/173 |
| 2005/0248529 A1 * | 11/2005 | Endoh | 345/156 |

FOREIGN PATENT DOCUMENTS

| | | |
|---|---|---|
| JP | 2005168005 A | 6/2005 |
| WO | WO2004047011 A2 | 6/2004 |
| WO | 2005062273 A1 | 7/2005 |
| WO | WO2005062273 A1 | 7/2005 |
| WO | 2007007227 A2 | 1/2007 |

OTHER PUBLICATIONS

H. Cantzler et al "A Novel form of a pointing Device", Intelligent Systems Lab, Btexact Technologies, Ipswich, UK.

* cited by examiner

METHOD OF CONTROLLING A CONTROL POINT POSITION ON A COMMAND AREA AND METHOD FOR CONTROL OF A DEVICE

This invention relates to a method of controlling a position of a control point on a command area, and to a method for control of a device. Furthermore, the invention relates to an appropriate system and a pointing device for controlling a position of a control point on a command area, and to an appropriate system for controlling a device.

For control of a device, such as any consumer electronics device, e.g. television, DVD player, tuner, etc., a remote control is generally used. However, in the average household, multiple remote controls can be required, often one for each consumer electronics device. Even for a person well acquainted with the consumer electronics devices he owns, it is a challenge to remember what each button on each remote control is actually for. Furthermore, the on-screen menu-driven navigation available for some consumer electronics devices is often less than intuitive, particularly for users that might not possess an in-depth knowledge of the options available for the device. The result is that the user must continually examine the menu presented on the screen to locate the option he is looking for, and then look down at the remote control to search for the appropriate button. Quite often, the buttons are given non-intuitive names or abbreviations. Additionally, a button on the remote control might also perform a further function, which must first be accessed by pressing a mode button.

Sometimes, a single remote control device can be used to control a number of devices. Since the remote control is not itself capable of distinguishing one device from another, the remote control must be equipped with a dedicated button for each device, and the user must explicitly press the appropriate button before interacting with the desired device.

A possible alternative to the usual remote control may be a pointing device. A user interface system based on a pointing device is known from WO 2004/047011 A2 which disclosure is herewith included by reference. The concept of such a system is that a pointing device connected to a camera can be used to control any device in its surroundings by being aimed at an object, e.g. a housing of the device, a screen, or any other application or accessory associated with the device. The camera of the pointing device generates images of the target area at which it is being aimed, and these images are subsequently analysed.

In many applications for controlling a device, a number of user options for the device to be controlled are visually presented on a command area or graphical user interface. If the device—e.g. a television, personal computer or laptop—avails of a screen, a beamer or other image rendering means, such a command area can be presented with the aid of the image rendering means. Furthermore, a command area for a device to be controlled can be presented in any other way, upon which the options for this device can then be presented. For example, a central control unit might feature a display upon which the command area is presented. Thereby, the exact position of the pointing axis (i.e., the point visible in the centre of the captured images) can be determined in the command area. This allows for instance control of a control point, for example a cursor, on the command area and thus navigation through menus and other styles of interaction which are usually possible with a graphical user interface, such as create sketches etc. Other important possible interaction modes may comprise "beyond-screen" interaction, such as scrolling up or down when pointing above or below the screen, performing drag-and-drop operations between screens, and gesturing by performing pre-defined or user-defined geometric motion patterns "in the air".

For allowing such "mouse-like" control of a control point on a command area from at a distance, it is essential to allow accurate interaction up to the maximally possible distance given by the user's optical capabilities, i.e. the resolution of the eyes in relation to the dimensions of the controlled object. With the help of visual aids, this typically goes beyond the range for which accurate hand coordination is possible. In fact, when the distance to the command area becomes relatively large, the angular range in which the direct interaction takes place, i.e. the angle under which the command area is seen from the user's position, gets relatively small. As a result, the interaction becomes more difficult to perform accurately, owing to the strong negative influence of jitter and unconscious movements of the hand holding the pointing device.

Therefore, an object of the present invention is to provide an easy and reasonable way which allows the exact controlling of a control point on a command area, also from larger distances.

To this end, the present invention provides a method of controlling a position of a control point on a command area, wherein—as mentioned above—a pointing device comprising a camera is aimed in the direction of the command area, an image of a target area aimed at by the pointing device is generated and the target area image is processed to determine the target point at which the pointing device is aimed. Thereby, according to the invention, the control point position in the command area is determined depending on the position of the target point within a currently defined control area, which control area at least partially includes the command area. Therefore, according to the invention, whenever the user aims the pointing device at a real target point (also called "actual target point" in the following) within the "virtual" control area, the real pointing position in relation to the virtual control area will be converted to a virtual pointing position in relation to the actual command area, whereby this virtual pointing position corresponds to the control point position.

By ascertaining the real target point within the virtual control area in the manner according to the invention, and by mapping this position of the target point to the current command area, it is possible to adapt the control area, required for locating the target point, to the current situation. Particularly advantageously, the control area can be enlarged in relation to the command area, especially in the case when the user is positioned far away from the device. Use of a virtual control area adapted to the distance between the pointing device and the command area ensures that slight movements of the pointing device are not interpreted as correspondingly great movements in the command area, enabling the user to direct the pointing device more precisely within the command area. This applies in particular to angular movements of the pointing device which, with increasing distance from the command area, result in proportionally large linear motions of the real target point in the command area.

A "control point" is intended to mean not just the usual cursor, but any kind of visual feedback for showing the user at which point in the command area he is currently aiming. It could, for example, be a light point projected onto the command area by, if necessary, a separate device. Equally, certain areas symbolising different menu items might be highlighted, as is often the case in menu-driven graphical user interfaces, when the control point lands in such an area.

Since the control point is shown by means of a suitable visual feedback, the user of the method according to the invention will not, even at a large distance, be given the impression that he is pointing outside of the command area, even so this is the case. He would only notice the discrepancy if he were to look along the length of the pointing device. Instead, he is simply given the impression of better controllability of the control point in the command area.

As mentioned above, this method is advantageous particularly when the user wishes to interact with the command area over a large distance. Therefore, enlarging the control area in relation to the command area is the preferred application of the invention. However, it is equally possible to create a virtual control area that is smaller than the actual command area. An example might be controlling a presentation setup, in which the command area is displayed greatly magnified on a backdrop for a presentation, and where the person giving the presentation is standing relatively close to the backdrop. In such a situation, it might be opportune to designate a smaller area for the control area, so that the user can target all regions in the command area with the control point, but with smaller movements of the pointing device.

An appropriate system for controlling a position of a control point on a command area comprises a pointing device with a camera for generating images of a target area in the direction of pointing and an image processing unit for processing the target area images to determine the target point at which the pointing device is aimed. According to the invention, the system must further comprise a control point position calculation unit for determining the control point position depending on the position of the target point within a currently defined control area, which control area at least partially includes the command area. Furthermore, the system should comprise a control point visualization unit for visualization of the control point on the command area.

The dependent claims and the subsequent description disclose particularly advantageous embodiments and features of the invention.

In a preferred embodiment of the invention, the dimensions and/or location of the control area are defined according to the momentary pointing conditions and/or the control situation. The term "pointing conditions" means not only the distance, but also the angle between the pointing device and the command area. Depending on the position of the pointing device relative to the command area, not only the dimensions of the control area can be determined, but also the aspect, i.e. whether the control area is offset above, below, or laterally relative to the command area. The term "control situation" implies, amongst others, the type of menu, the size of the individual menu items etc., in the command area. For example, in a situation in which a menu with a large number of menu items is being displayed in the command area, where each menu item offers only a relatively small activation region, i.e. the area in which the pointing device must be aimed in order to select the menu item, it makes sense to offer an enlarged virtual control area, even in the case of relatively small distances from the command area, in order to make it easier for the user to precisely aim at an individual menu item or its activation region. On the other hand, if only a relatively small number of options, with relatively large activation regions are being shown in the command area, it suffices that the control area remains the same size as the command area, even for larger distances.

As mentioned above, the dimensions of the control area are preferably defined first of all according to the distance between the pointing device and the command area. A number of possibilities exist for the manner in which the dimensions of the control area are enlarged according to the distance between the pointing device and the command area.

In one embodiment, the dimensions of the control area are extended or enlarged if the distance between the pointing device and the command area exceeds a certain limit. According to this method, for example, the control area can coincide with the command area for a first, relatively small, distance. Should the user move with the pointing device beyond a certain distance threshold away from the command area, the virtual control area will be enlarged by a certain amount. Beyond another further distance threshold, the virtual control area can again be enlarged by a certain amount. An incremental step-wise enlargement of the control area, depending on the distance, is thus made possible. The distance threshold can thereby basically be chosen to be as small as desired, so that an apparently continuous transition is possible. The values for the distance thresholds and the corresponding dimensions of the control area can be stored in a table.

Alternatively, an appropriate continuous relationship between the dimensions of the control area and the distance from the command area can be defined in a suitable function. For example, a distance-dependent enlargement factor can be chosen, which specifies the extent to which the dimensions of the virtual control area are magnified in comparison to the actual size of the command area.

Preferably, at least for very great distances, the extension factor which defines the enlargement or re-sizing of the dimensions of the control area according to the dimensions of the command area should be proportional to the distance between the pointing device and the command area.

In a further preferred embodiment—if the user is aiming at a target point outside of the current control area—the dimensions of the control area are enlarged such that the target point lies inside the new control area.

One potential choice using this feature would be to always enable direct interaction, i.e. the virtual control area corresponds to the physical command area for all distances so long as the user is aiming the pointing device at a point within the command area. Only when the user points outside the command area, another value for the enlargement factor will be applied, thus allowing a relative scaling. This method, however, has the disadvantage of a discontinuity at the display boundaries.

In a preferred alternative—as in the alternative above—the interaction is initially direct. If the user aims the pointing device at a point outside of the physical screen, the extension or enlargement factor is increased such that the actual axis of pointing, and therefore ultimately the actual target point, coincides with a point on the boundary of the (updated) virtual control area. In this alternative, the extension factor is therefore not just a function of the distance alone, but depends also on user behaviour. Such an operation may be called a "punch" since the virtual control area behaves as if its borders were pushed or punched outwards when the pointing position (apparently) tries to traverse them. Preferably, a minimum distance and/or a minimum time might apply before this condition triggers.

In order to allow "beyond-screen" interaction, e.g. scrolling up/down by pointing above/below the screen, this feature might be active only in one direction (in this case the X axis), or it might be that just one of the four sides of the rectangular control area is "punchable". In any case, the fact, that the user puts away the pointing device or starts pointing at something else in the room, can be detected, so that these events will not lead to punches of the virtual screen area.

In a preferred embodiment, the dimensions of the control area are decreased again after a certain time period during which the user is not aiming at a target point outside of a certain region of the current control area. For example, if the user does not punch against the boundaries of the momentary control area, the extension factor decreases slowly with time, ultimately converging towards a value of 1. Preferably the time constant is relatively long, e.g. in the order of seconds to minutes. The virtual control area will thus adapt to the user's preferred dimensions. This alternative will also guide users, inexperienced in this direct method of pointing, but who may have experience with indirect methods of control, such as with a computer mouse, to automatically make the mental transition from the relative pointing paradigm to the direct manipulation paradigm.

Since the pointing device allows controlling of very different devices, in particular devices which might be in the immediate vicinity of each other, a conflict of control areas of neighbouring devices should be avoided. An overlap of control areas of two different devices could result in an ambiguous conclusion as to which device the user is actually aiming at. There are a number of possibilities for dealing with such a situation:

In a first—very simple—solution, the control areas of adjacent command areas are chosen so that the control areas do not overlap. That means the virtual control areas are kept completely separate.

In a further preferred embodiment, only a certain region of a command area, for example the centre or central region of the command area, of one device is kept out of the virtual control area of the other adjacent device and vice versa. Then, preferably a command area can be activated by aiming at that certain region of the corresponding command area and the extended control area associated with the currently active command area is chosen so that it does not overlap with the certain region of the adjacent command area. That means, in the latter case, the pointing ambiguity can be resolved by always choosing the device that was previously targeted, i.e. only switching to the other device when the pointing direction uniquely determines the target device. The user will then experience a kind of hysteresis effect: the control tends to stick to one device, and only by pointing to a certain "activating region", for example the central parts of the command area, can the focus be shifted to the other device.

In a method for control of a device according to the invention, the pointing device with the camera is aimed in the direction of the command area associated with the device to be controlled, within which command area is presented a number of options for controlling the device. Visual feedback of the position of the momentary control point is given in this command area, for example in the form of a cursor. Subsequently—as explained above—an image of a target area aimed at by the pointing device is generated, and the target area image is processed to determine the target point at which the pointing device is aimed. According to the invention, the chosen option is determined depending on the position of the control point within the command area, wherein the control point position is controlled according to the method explained above.

An appropriate system for controlling a device comprises a command area for visually presenting user options for the device to be controlled, a system for controlling a control point positioned on the command area as explained above, and an interpreting unit for interpreting or determining the chosen options according to the position of a control point within the command area. This interpreting unit may also generate a control signal for the device to be controlled according to the chosen option.

Identification of the chosen option on the basis of the current control point position, and generation of the control signal can be effected in the usual manner, e.g. as is the case for a mouse controlled application, known to a person skilled in the art.

To determine the momentary actual target point in the control area, computer vision algorithms can be applied. A method of processing the image data of the target area image using computer vision algorithms might comprise detecting distinctive points in the target image data, determining corresponding points in a template of the command area, e.g. the screen, of the device or in the (known) surroundings of the command area, and developing a transformation for mapping the points in the image data to the corresponding points in the template. This transformation can then be used to determine the position and aspect of the pointing device relative to the virtual control area including the command area so that the point of intersection of the pointing axis with the control area can be located in the template. The position of this intersection in the template corresponds to the target point in the control area which can be used to easily determine the corresponding control point in the command area, for example to identify which option has been targeted by the user. Comparing the image data with the pre-defined template may thereby be restricted to identifying and comparing only salient points such as distinctive corner points. The term "comparing", as applicable in this invention, is to be understood in a broad sense, i.e. by only comparing sufficient features in order to quickly identify the option at which the user is aiming.

In a particularly preferred embodiment of the invention, the processing of the target area images to identify the target point in the control area or the control point in the command area might be carried out within the pointing device itself. However, the computing power of such a pointing device, which is preferably realized to be held comfortably in the hand, is necessarily limited by the power required by complicated computing processes. Therefore, the target images are preferably transmitted for further processing to a control unit associated with the device to be controlled. The control unit can identify the target point in the control area and the control point in the command area and may further send a control signal to the device which generates the command area in order to give a visual feedback of the control point position to the user, e.g. in form of a cursor position. This control unit may also determine a control signal for the device to be controlled on the basis of an identified option selected by the user.

Such a control unit may be, for example, part of the device and may be incorporated in the same casing as the device itself. In another embodiment, this control unit may be realised as a separate entity which can communicate in any appropriate manner with the device to be controlled, whereby such a control unit may be capable of controlling more than one device.

The pointing device and control units described in the above combine to give a powerful control system, for use in practically any kind of environment, such as a home, office, museum, hospital or hotel environment. The method according to the invention can be applied to any electrically or electronically controllable device. Furthermore, the control unit and the device to be controlled can comprise any number of modules, components or units, and can be distributed in any manner.

Other objects and features of the present invention will become apparent from the following detailed descriptions considered in conjunction with the accompanying drawings. It is to be understood, however, that the drawings are designed solely for the purposes of illustration and not as a definition of the limits of the invention.

In the drawings, like numbers refer to like objects throughout. The pointing device described is held and operated by a user, not shown in the drawings.

The underlying principle of the invention, as already explained above, is that a certain command area, in which are displayed various options for control of the device, is converted to a virtual control area. Thereby, the position of the real or actual target point within this virtual control area will be converted into the coordinates of a control point, for example the position of the cursor, within the command area. Generally it is a virtual enlargement of the command area that will be effected, thus making it easier for the user to direct a cursor or similar point within the confines of the command area. Therefore, in the following, the example of an enlarged control area being assigned to a command area is used for the purposes of illustration, but without confining the invention to this example.

Figure 1:
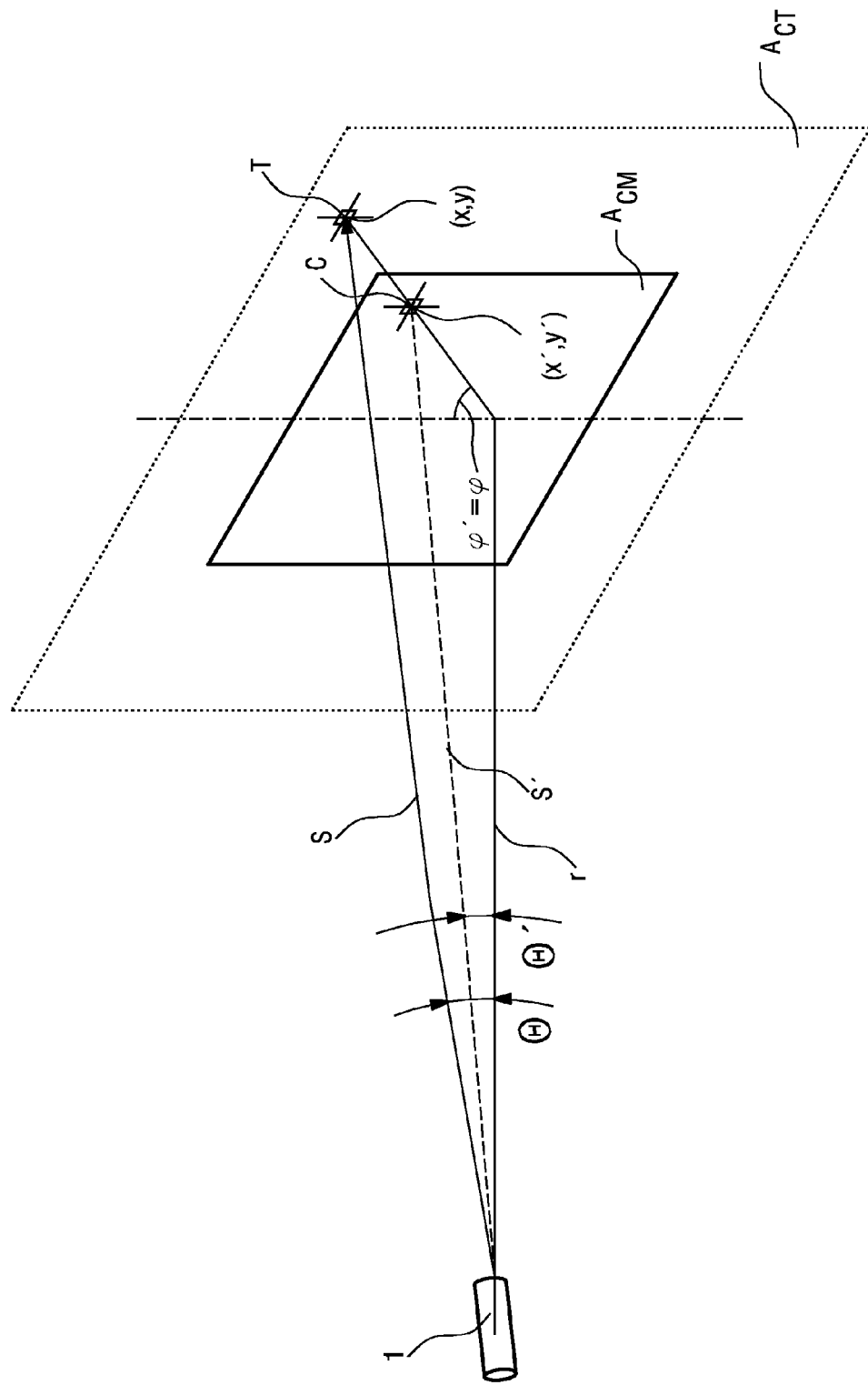
FIG. 1 is a schematic perspective representation of the principle of an extended virtual control area associated with a command area.

As shown in FIG. 1, the principle of the transformation from a real target point T in a virtual extended control area $A_{CT}$ to the control point C in the real command area $A_{CM}$ is to map the actual pointing ray s to a virtual pointing ray s' which is closer to the centre of the command area $A_{CM}$. In general, this is achieved by defining a mapping from the spherical coordinates ($\theta'$, $\phi'$) of the actual pointing axis s to the spherical coordinates ($\theta'$, $\phi'$) of the virtual pointing axis s'. It is very natural to assume that the mapping should be rotationally symmetric, i.e. depending only on $\theta$. Therefore, one can set $\phi'=\phi$ and $\theta'=f_r(\theta)$ with some function family f being parameterized by the distance r between the user, i.e. the pointing device 1, and the command area $A_{CM}$.

In order to avoid trigonometric complications it is advantageous—and at the same time very natural—to chose a dependence of the form $$\theta'=\arctan(\alpha(r)\cdot\tan(\theta))$$

because this translates—under the assumption that the origin of the coordinate system lies in the centre of the command area—to a linear transformation when changing over to a two-dimensional coordinate system in the plane of the command area $A_{CM}$. The following then applies:

$$x'=\alpha(r)\cdot x$$

$$y'=\alpha(r)\cdot y$$

Thereby, the distance dependent factor $\alpha(r)$ can be regarded as a scale factor. The value of $\alpha(r)$ must lie between 0.0 and 1.0; the smaller the value, the larger is the enhancement or enlargement factor by which the dimensions of the virtual control area $A_{CT}$ are magnified or enlarged in relation to the real size of the command area $A_{CM}$.

For an explicit choice of the dependency of $\alpha$ on r, the following constraints should preferably be taken into account:

For very large distances, the angle at which the virtual control area appears, as seen from the user's point of view, should remain constant, since, on the one hand, it would be counter-intuitive if the angle should increase with distance, whereas on the other hand, it should not decrease below a certain critical limit. Therefore, the scale factor should preferably be chosen so that:

$$\alpha(r)\sim 1/r \text{ for } r\to\infty$$

For small distances, the benefit of extension of the control area $A_{CT}$ at some point is outweighed by the intuitiveness of direct interaction ("what you point at is what you control"). Therefore, for small distances, the scale factor should preferably approach 1:

$$\alpha(r)=1 \text{ for small } r$$

Probably the best way to bring these two constraints together is by a smooth, incremental combination in the form:

$$\alpha(r)=\min(1,r_0/r)$$

The distance parameter $r_0$ can be interpreted as the distance at which the behaviour smoothly switches from direct interaction on the command area $A_{CM}$ to interaction on the virtual extended control area $A_{CT}$. This distance parameter $r_0$ might be set, for example, depending on the device or on the current application.

Alternatively, or additionally, the distance parameter $r_0$ may also be chosen depending on the user's preferences and/or the user's experience/abilities. For example, the distance parameter $r_0$ can be adjusted by the user according to an expected degree of jitter, and/or the user's pointing accuracy might be measured (in a calibration step) and $r_0$ adjusted accordingly.

Figure 2:
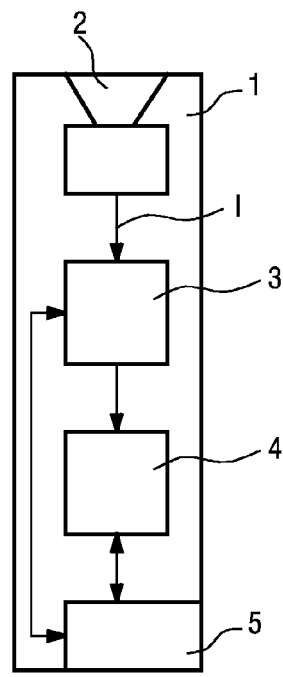
FIG. 2 is a schematic representation of a pointing device for use with the invention.

FIG. 2 shows a greatly simplified embodiment of a pointing device 1 for use in a method according to the invention. This pointing device 1, with a camera 2 in its forward end, features a housing in the shape of a wand or pen in an elongated form that can be grasped comfortably and easily carried around by the user. Equally, the pointing device might be shaped in the form of a pistol.

Target area images I generated by the camera 2 are transmitted to an image processing unit 3, which processes the target area images I to determine the position of the actual or real target point T at which the user is aiming the pointing device 1. Ascertaining the target point T and the distance r can be achieved with the aid of templates of the command area $A_{CM}$ or the area surrounding the command area $A_{CM}$, by comparing the target area image I to these templates. The actual method of determining the target point T will be explained in more detail below with the aid of FIG. 6.

The target point T is then forwarded to a control point position calculation unit 4, which determines the control point position, i.e. the coordinates x', y' of the control point C within the command area $A_{CM}$, according to the coordinates x, y of the target point T within the virtual control area $A_{CT}$. The dimensions and position of the current control area $A_{CT}$ can also be determined in this control point processing unit 4. The necessary data for this calculation, for example the distance between the pointing device 1 and the command area $A_{CM}$ can also be deduced from the target area image I, for example from the image processing unit 3. The image processing unit 3 and the control point processing unit 4 can, for example, be realised in the form of software modules on a programmable processor of the pointing device 1.

The coordinates x', y' of the control point C can subsequently be transmitted by a communication interface 5 to a control unit 6 of a device $D_1$ to be controlled (cf. FIG. 3). The communication interface 5, which might be a standard interface such as Bluetooth, IEEE or similar, might also be implemented to receive or transmit other data for the pointing device 1. For example, the templates for the various devices and/or corresponding command areas $A_{CM}$ with their surroundings might be supplied to the pointing device 1 using such an interface 5, so that the image processing steps can be carried out in the pointing device 1. Insofar as the pointing device 1 avails of other components such as buttons, knobs or other type of user interface, by means of which additional signals can be generated for use in the control of the device $D_1$, these can of course also be transmitted via the communication interface 5.

It goes without saying that the pointing device 1 can comprise other components besides those mentioned above, for example buttons, or a type of user interface by means of which a user can input additional commands for the generation of a control signal for a device. In regard to such additional components, reference is made once more to WO2004/047011A2, in which a number of additional components for such a pointing device are described in detail. The pointing device can also be used for the generation of control signals in the manner described therein. For example, besides simply pointing at a target, the pointing device can be moved in a particular manner or gesture which can be interpreted in a particular manner for the generation of control signals.

Figure 3:
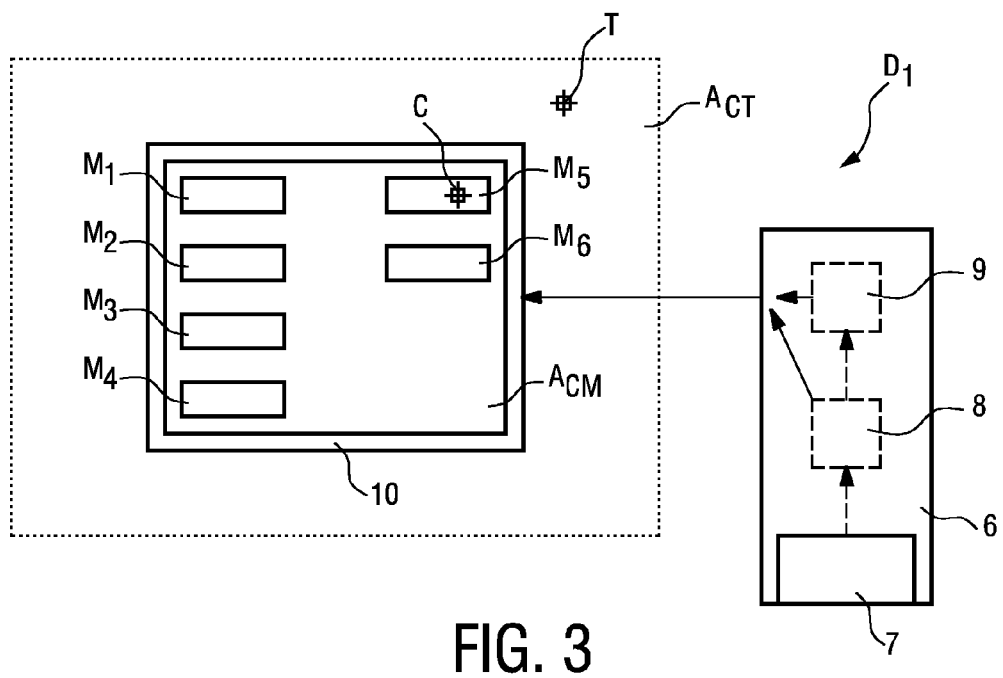
FIG. 3 is a rough schematic representation of a device controllable according to the invention.

FIG. 3 shows, in a very simplified schematic overview, the components necessary for elucidation of the invention, of a device $D_1$ to be controlled. Here, the device $D_1$ to be controlled comprises a monitor 10, upon which a command area $A_{CM}$ is displayed with a menu featuring a number of menu items M1, M2, M3, M4, M5, M6 for selection by the user. A further component of this device $D_1$ is a control unit 6, shown separately from the monitor 10, as might be the case for a personal computer. This control unit 6 can of course be incorporated with the monitor 10 in a single housing, as is generally the case for a television.

Components of this control unit 6, necessary for the invention, are for instance a communication interface 7, which, in particular, can receive signals and data from the communication interface of the pointing device 1, or transmit signals and data to the pointing device 1. Further components are a control point visualisation unit 8 and an interpretation unit 9, the function of which will be explained below.

The coordinates x', y' of the control point C within the command area $A_{CM}$, received by the communication interface 7, are initially forwarded to the control point visualisation unit 8. With the aid of this unit 8, a cursor—for example a small square, cross, arrow or similar, is controlled such that the user can see the point in the command area $A_{CM}$ at which he is apparently aiming the pointing device 1. The coordinates x', y' of the control point C are also forwarded to an interpreting unit 9. This interpreting unit 9 serves to interpret the position of the control point C in order to determine which of the displayed options M1, M2, M3, M4, M5, M6 in the command area $A_{CM}$ the user is selecting. To this end, the interpreting unit 9 must know the status of the menu currently shown in the command area $A_{CM}$. Then, using the coordinates x', y' of the control point C, it can determine at which of the options M1, M2, M3, M4, M5, M6 the user is currently pointing. The interpreting unit 9 can also be responsible for the current status of the graphical user interface in the command area.

The control point visualisation unit 8 and the interpreting unit 9 might be realised in the form of software modules of a programmable processor of the control unit 6.

Evidently, the control unit or the device to be controlled $D_1$ will feature a number of further components necessary or desirable for the operation of such a device, such as a power supply, various interfaces and components for controlling the various applications of the device, for instance a receiver for receiving television signals in the case of a television, or a DVD carriage in the case of a DVD recorder, etc. For the sake of simplicity, these components are not shown in FIG. 3. However, it will be clear to a person skilled in the art which components are necessary for each type of device.

Once again, it will be stressed that it is not necessary to realise the image processing unit 3 and the control point processing unit 4 within the pointing device 1. One or both of these units 3, 4 could equally well be realised within the control unit 6. In this case, for example, the target area images I generated by the camera 2 will be directly transmitted, for example via the transmitter module 5, to the control unit 6. Equally, the image processing unit 3 and the control point position calculation unit 4 might also be realised together in a separate entity.

Figure 4:
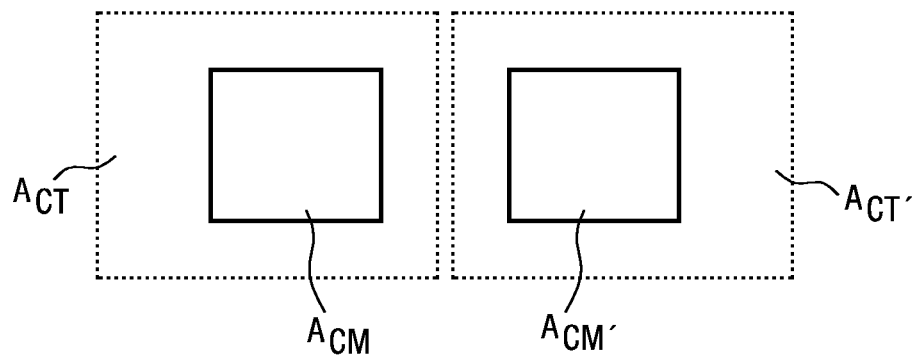
FIG. 4 is a schematic representation of two neighbouring command areas and their corresponding control areas according to a first embodiment.
Figure 5:
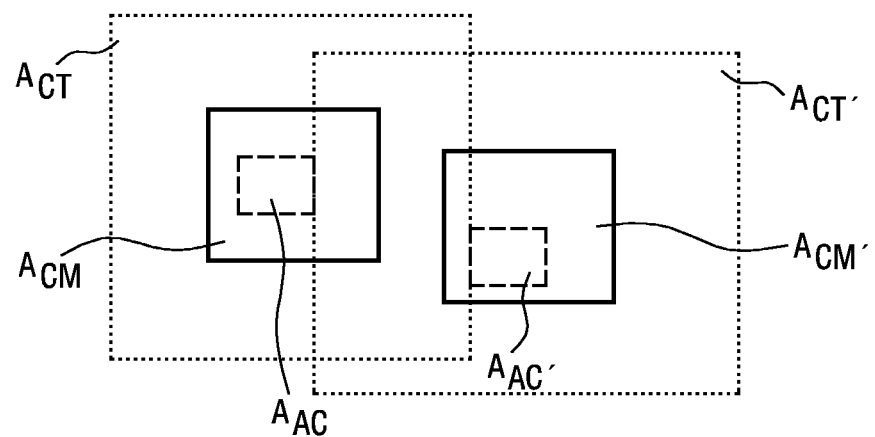
FIG. 5 is a schematic representation of two neighbouring command areas and their corresponding control areas according to a second embodiment.

FIGS. 4 and 5 illustrate a situation in which two devices, each with its own command area $A_{CM}$, $A_{CM'}$ are located directly beside each other. In such a situation, problems could arise when the control areas $A_{CT}$, $A_{CT'}$ associated with the command areas $A_{CM}$, $A_{CM'}$ would overlap. Were the user to point at an overlap area, this might result in indecision as to which of the two devices the user wishes to control.

FIG. 4 shows one solution, which ensures that no overlap whatever arises between the control areas $A_{CT}$, $A_{CT'}$ of the neighbouring command areas $A_{CM}$, $A_{CM'}$. This can be done by making known to the devices or to the pointing device the locations of the different $A_{CM}$, $A_{CM'}$, and/or having previously assigned certain regions to the individual command areas $A_{CM}$, $A_{CM'}$, within which the control areas $A_{CT}$, $A_{CT'}$ are permitted to move. FIG. 4 shows that this can lead to the control area $A_{CT}$, $A_{CT'}$ of a command area $A_{CM}$, $A_{CM'}$ is not symmetric about its corresponding command area $A_{CM}$, $A_{CM'}$. Ideally however, the control area $A_{CT}$ should extend proportionally in each direction about the corresponding command area $A_{CM}$, since this offers a more intuitive interaction.

An overlapping of the control areas $A_{CT}$ can also be avoided by having the different virtual control areas $A_{CT}$, $A_{CT'}$ "repel" each other, i.e., by taking a neighbouring control area $A_{CT}$, $A_{CT'}$ into consideration whenever a control area $A_{CT}$, $A_{CT'}$ is being enlarged. If a neighbouring control area would be touched by a control area $A_{CT}$, $A_{CT'}$ being enlarged, the neighbouring control area will shrink as the control area $A_{CT}$, $A_{CT'}$ is enlarged, or a further enlargement of the control area $A_{CT}$, $A_{CT'}$ will be prohibited.

FIG. 5 shows a further alternative. Here, the control areas $A_{CT}$, $A_{CT'}$ are permitted to extend until they touch a certain region, a so-called activation region $A_{AC}$, $A_{AC'}$ of a neighbouring command area $A_{CM}$, $A_{CM'}$. Thus, only one control area $A_{CT}$, $A_{CT'}$ is ever active. Activation is effected when the user aims the pointing device in the activation region $A_{AC}$, $A_{AC'}$ of the corresponding command area $A_{CM}$, $A_{CM'}$. This means that the user can switch as desired between command area $A_{CM}$ and command area $A_{CM'}$, depending on which device he currently wishes to control.

Figure 6:
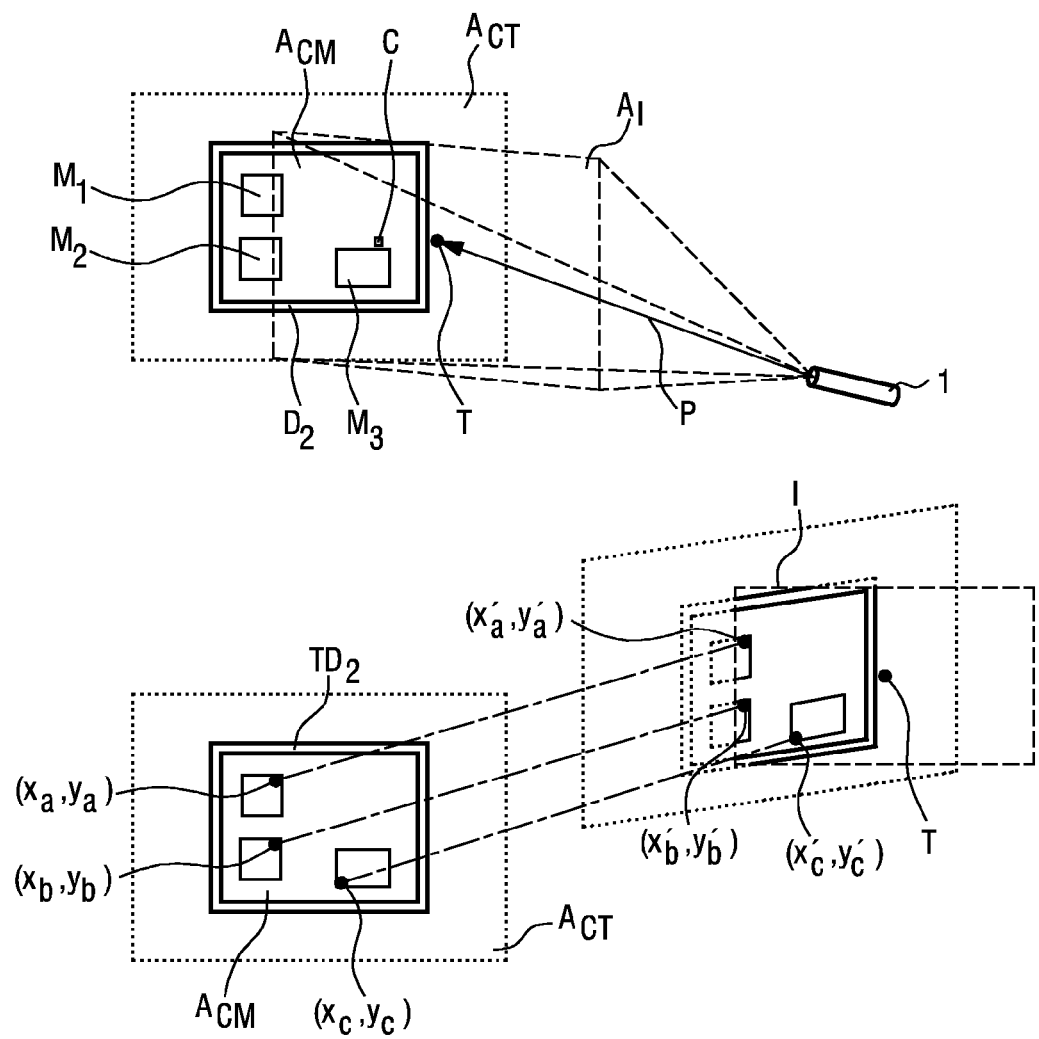
FIG. 6 is a schematic diagram showing a command area, realised by a screen, its associated control area, its associated template, and a target area image generated by a pointing device in accordance with an embodiment of the present invention.

At this point it will be explained in more detail, together with FIG. 6, how the position x, y of the real target point T, being aimed at with the pointing device 1, can be determined with the aid of templates of the command area and/or its surroundings.

The user will not always aim the pointing device 1 at the command area $A_{CM}$ from directly in front—it is more likely that the pointing device 1 will be aimed at a more or less oblique angle to the command area $A_{CM}$, since it is often more convenient to aim the pointing device 1 than it is to change one's own position. This is illustrated in FIG. 6, which shows a schematic representation of a target area image I generated by a pointing device 1, aimed at a device $D_2$, in this case a television screen or computer monitor, from a distance and at an oblique angle, so that the scale and perspective of the device $D_2$ in the target area $A_I$ appear distorted in the target area image I.

A number of options $M_1$, $M_2$, $M_3$ can be seen on the display of the device $D_2$. The user, not shown in the diagram, may wish to select one of these options $M_1$, $M_2$, $M_3$ with the aid of the pointing device 1. Also visible in the display of the device $D_2$ is a cursor at the position of the momentary control point C, thus assisting the user who is aiming the pointing device 1. As explained above the current position of the control point C is calculated depending on the position of the real target point T in a virtual extended control area $A_{CT}$.

To find the position of the real target point T, the target area image I is examined in more detail. Regardless of the angle of the pointing device 1 with respect to the device $D_2$, the target area image I is always centred around the target point T. Therefore, this point is relatively easily determined within the target area image I. It only remains to determine the relationship between the coordinates of this point T to the command area $A_{CM}$ or the centre of the command area $A_{CM}$. Alternatively of course, the coordinates can be determined relative to another point in the command area $A_{CM}$, for example to a corner point of a displayed user option, or to any notable point of the monitor such as a corner point, whereby these coordinates can then be converted to the desired origin. Since the measurements of the virtual extended control area are preferably carried out in the same coordinate system, it is therefore trivial to determine the coordinates of the actual target point T within the virtual extended control area $A_{CT}$.

For determination of the coordinates of the real target point T in the chosen coordinate system, the image processing unit 3 compares the target area image I with pre-defined templates $TD_2$.

Therefore, computer vision algorithms using edge- and corner detection methods are applied to locate points $[(x_a', y_a'), (x_b', y_b'), (x_c', y_c')]$ in the target area image I which correspond to points $[(x_a, y_a), (x_b, y_b), (x_c, y_c)]$ in the template $TD_2$ of the device $D_1$.

Each point can be expressed as a vector e.g. the point $(x_a, y_a)$ can be expressed as $\vec{v}_a$. As a next step, a transformation function $T_\square$ is developed to map the target area image I to the template $TD_2$:

$$f(\lambda)=$$

$$f(\lambda) = \sum_i |T_\lambda(\vec{v}_i) - \vec{v}'_i|^2$$

Where the vector $\vec{v}_i$ represents the coordinate pair $(x_i, y_i)$ in the template $TD_2$, and the vector $\vec{v}'_i$ represents the corresponding coordinate pair $(x'_i, y'_i)$ in the target area image I. The parameter set $\lambda$, comprising parameters for rotation and translation of the image yielding the most cost-effective solution to the function, can be applied to determine the position and orientation of the pointing device 1 with respect to the command area $A_{CM}$. The distance between, for example, the pointing device 1 and the command area $A_{CM}$ can be determined in this way. Furthermore—since the target point T is always the centre of the target area image I—the coordinates of the target point T in the template $TD_2$ of the command area $A_{CM}$ can be determined.

Although the present invention has been disclosed in the form of preferred embodiments and variations thereon, it will be understood that numerous additional modifications and variations could be made thereto without departing from the scope of the invention. The pointing device can serve as the universal user interface device in the home or any other environment with electrically or electronically controllable devices. In short, it can be beneficial wherever the user can express an intention by pointing. Its small form factor and its convenient and intuitive pointing modality can elevate such a simple pointing device to a powerful universal remote control. As an alternative to the pen shape, the pointing device could for example also be a personal digital assistant (PDA) with a built-in camera, or a mobile phone with a built-in camera. For the sake of clarity, it is also to be understood that the use of "a" or "an" throughout this application does not exclude a plurality, and "comprising" does not exclude other steps or elements. A "unit" may comprise a number of blocks or devices, unless explicitly described as a single entity.

The invention claimed is:

1. A method for controlling a position of a control point on a command area comprising a graphical user interface including a number of user options for a device to be controlled, the method comprising acts of:

aiming a pointing device comprising a camera in a direction of the command area, the aiming of the pointing device defining a real target point within a virtual control area, the virtual control area being centered around the real target point and at least partially including the command area;

generating an image of the virtual control area aimed at by the pointing device;

determining from the generated image of the virtual control area the position of the target point at which the pointing device is aimed and a distance from the pointing device to the virtual control area by selectively comparing only distinctive corner points in the generated virtual control area image and determining corresponding points in pre-defined, pre-stored templates of the command area or areas surrounding the command area; and calculating the control point position within the command area dependent upon the position of the real target point within the virtual control area, wherein the position of the control point in the virtual control area is at least at times different than the position of the target point in the virtual control area;

wherein the dimensions and/or location of the virtual control area are defined according to momentary pointing conditions of the pointing device including the distance and angle between the pointing device and the command area and/or the control situation including a type and size of individual menu items in the command area wherein the dimensions of the virtual control area are extended in accordance with changes in distance between the pointing device and the command area.

2. The method according to claim 1, wherein the dimensions of the virtual control area are defined according to a distance between the pointing device and the command area.

3. The method according to claim 1, wherein the dimensions of the virtual control area are extended if a distance between the pointing device and the command area exceeds a predetermined limit.

4. The method according to claim 1, wherein an extension factor, which defines the ratio of the dimensions of the virtual control area to the dimensions of the command area, is proportional to a distance between the pointing device and the command area.

5. The method according to claim 1, wherein the dimensions of the virtual control area are extended if the pointing device is aimed at a target point outside of the current virtual control area.

6. The method according to claim 1, wherein the dimensions of the virtual control area are decreased after a predetermined time period during which the pointing device is not aimed at a target point outside of a certain region of the current virtual control area.

7. The method according to claim 1, wherein the virtual control areas of adjacent command areas are chosen so that the virtual control areas do not overlap.

8. The method according to claim 1, wherein the command area can be activated by aiming at a certain region of the command area, and an extended virtual control area associated with the currently active command area is chosen not overlap with at least a certain region of an adjacent command area.

9. The method of claim 1, comprising displaying the determined control point in the command area on a display device.

10. The method of claim 1, wherein the dimensions and/or location of the virtual control area are defined according to momentary pointing conditions and/or control situation.

11. The method of claim 1, wherein the determining of the position of the control point only occurring when the target point is within a currently defined control area which at least partially includes the command area.

12. A method for controlling a device using a control point projection, the method comprising acts of:
aiming a pointing device comprising a camera in a direction of the command area, the aiming of the pointing device defining a real target point within a virtual control area, the virtual control area being centered around the real target point and at least partially including the command area;
generating an image of the virtual control area aimed at by the pointing device;
determining from the generated image of the virtual control area the position of the target point at which the pointing device is aimed and a distance from the pointing device to the virtual control area by selectively comparing only distinctive corner points in the generated virtual control area image and determining corresponding points in pre-defined, pre-stored templates of the command area or areas surrounding the command area; and
calculating the control point position within the command area dependent upon the position of the real target point within the virtual control area,
wherein the position of the control point in the control area is at least at times different than the position of the target point in the virtual control area; and
wherein the dimensions and/or location of the virtual control area are defined according to momentary pointing conditions of the pointing device including the distance and angle between the pointing device and the command area and/or the control situation including a type and size of individual menu items in the command area
wherein the dimensions of the virtual control area are extended in accordance with changes in distance between the pointing device and the command area.

13. A system for controlling a position of a control point on a command area, comprising:
a pointing device for aiming in a direction of the command area to choose one of the plurality of user options, the aiming of the pointing device defining a real target point centered in a virtual control area, the virtual control area at least partially including the command area;
a camera included in the pointing device for generating an image of the virtual control area aimed at by the pointing device;
a unit for determining from the generated image of the virtual control area the position of the target point at which the pointing device is aimed and a distance from the pointing device to the virtual control area by selectively comparing only distinctive corner points in the generated virtual control area image and determining corresponding points in pre-defined, pre-stored templates of the command area or areas surrounding the command area; and
an interpreting unit for calculating the position of the control point within the command area dependent upon the position of the target point within the currently defined control area that includes at least partially the command area, the position of the control point being at least at times different than the position of the target point,
wherein the dimensions and/or location of the control area are defined according to momentary pointing conditions of the pointing device including the distance and angle between the pointing device and the command area and/or the control situation including a type and size of individual menu items in the command area
wherein the dimensions of the virtual control area are extended in accordance with changes in distance between the pointing device and the command area.

14. A system for controlling a device, comprising:
a command area for visually presenting a plurality of user options for controlling the device;
a pointing device for aiming in a direction of the command area to choose one of the plurality of user options, the aiming of the pointing device defining a real target point centered in a virtual control area, the virtual control area at least partially including the command area;
a processor for controlling a position of a control point on the command area; and
a unit for determining from the generated image of the virtual control area the position of the target point at which the pointing device is aimed and a distance from the pointing device to the virtual control area by selectively comparing only distinctive corner points in the generated virtual control area image and determining corresponding points in pre-defined, pre-stored templates of the command area or areas surrounding the command area; and
an interpreting unit for calculating the position of the control point within the command area dependent upon the position of the target point, the position of the control point being at least at times different than the position of the target point
wherein the dimensions and/or location of the control area are defined according to momentary pointing conditions of the pointing device including the distance and angle between the pointing device and the command area and/or the control situation including a type and size of individual menu items in the command area wherein the dimensions of the virtual control area are extended in accordance with changes in distance between the pointing device and the command area.

15. The system according to claim 14, further comprising:
an image processing unit for processing an image of the virtual control area to determine the target point at which the pointing device is aimed; and
a control point visualization unit for visualizing the control point on the command area.

16. The system according to claim 14, further comprising:
a pointing device that includes a camera for generating an image of the virtual control area in a direction aimed at by the pointing device, and
an image processing unit for processing the image in order to determine the target point at which the pointing device is aimed.

17. A method for controlling a position of a control point on a command area comprising a graphical user interface including a number of user options for a device to be controlled, the method comprising acts of:

aiming a pointing device comprising a camera in a direction of the command area, the aiming of the pointing device defining a real target point within an extended virtual control area, wherein the pointing device is aimed in the direction of the command area along an actual pointing axis, and wherein the extended virtual control area is centered around the real target point and at least partially includes the command area;

generating an image of the extended virtual control area aimed at by the pointing device;

converting the position of the real target point within the extended virtual control area into coordinates of a control point in the command area, comprising:

i. comparing the extended virtual control area with at least two predefined templates, comprising determining from the generated image of the virtual control area the position of the target point at which the pointing device is aimed and a distance from the pointing device to the virtual control area by selectively comparing only distinctive corner points in the generated virtual control area image and determining corresponding points in pre-defined, pre-stored templates of the command area or areas surrounding the command area; and ii. using the comparison to develop a rotationally symmetric mapping from spherical coordinates of the actual pointing axis to spherical coordinates of a virtual pointing axis, wherein the mapping comprises parameters for rotation and translation;

iii. using the mapping to determine the position and aspect of the pointing device relative to the extended virtual control area to locate the point of intersection of the actual pointing axis within the control area extending the dimensions of the virtual control area in response to a change in distance between the pointing device and the command area.

\* \* \* \* \*